June 5, 1951  O. R. SMITH  2,556,116
PIPE CLEANING EQUIPMENT
Filed April 27, 1948  2 Sheets-Sheet 1

Inventor
Oliver R. Smith
By
E. V. Hardaway,
ATTORNEY

June 5, 1951          O. R. SMITH          2,556,116

PIPE CLEANING EQUIPMENT

Filed April 27, 1948          2 Sheets-Sheet 2

Inventor
Oliver R. Smith

By
E. V. Hardway
ATTORNEY.

Patented June 5, 1951

2,556,116

UNITED STATES PATENT OFFICE 2,556,116

PIPE CLEANING EQUIPMENT

Oliver R. Smith, Fort Worth, Tex.

Application April 27, 1948, Serial No. 23,440

7 Claims. (Cl. 263—2)

This invention relates to a pipe cleaning equipment and has particular relation to equipment of the type referred to which includes an oven movable along the pipe to be cleaned.

It is an object of the invention to provide equipment of the character described which is particularly suitable for cleaning pipe lines that have been previously buried in the earth and which must be, from time to time, reconditioned to arrest corrosion.

Pipe lines must, at intervals, be raised above the ground surface and reconditioned.

When raised the line is initially cleaned mechanically by a type of pipe cleaner which removes the earth and other foreign matter from the surface of the pipe; but this mechanical operation does not remove all corrosion, particularly when the surface of the pipe is rough or pitted.

It is another object of the invention to provide an oven which partially surrounds the pipe and which is movable along the pipe line and by means of which heat may be applied to the surface of the pipe so as to destroy corrosion and foreign matter left on the surface of the pipe after the initial cleaning operation so that the pipe, before it is again buried, will be free of corrosive matter.

Thereupon the pipe is suitably coated and wrapped and then buried.

Another object is to provide equipment of the character described wherein the oven is open at the bottom to allow the ready discharge of foreign matter and which will not collect water or moisture which would otherwise freeze and form ice when the oven is being used in a very cold climate.

The invention also embodies a removable sleeve which may be inserted through the oven around the pipe and temporarily secured therein to be used when the pipe line is wet and it becomes necessary to dry the same for more efficient cleaning.

Other objects and advantages will be apparent from the following specification which is illustrated by the accompanying drawings, wherein—

Figure 1:
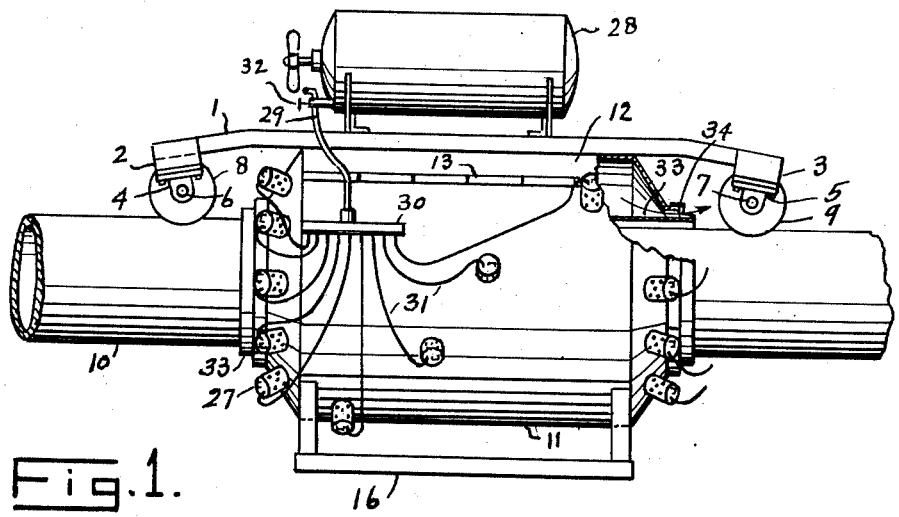
Figure 1 is a side elevation of the equipment with the sleeve therein all shown mounted on the pipe and also shown partly in section.

Referring now more particularly to the drawings the numeral 1 designates the body of the carriage which, in the present illustration, consists of a bar whose ends are bent downwardly slightly.

Secured to the front and rear ends of said bar there are similar brackets 2, 2 and 3, 3 which depend beneath the bar and whose lower ends are outwardly turned. Secured to said outwardly turned portions are the front and rear bearings 4, 4 and 5, 5 to receive the ends of the front and rear axles 6 and 7.

Mounted on these axles are the front and rear carrier wheels 8, 8 and 9, 9 whose margins are outwardly beveled to better conform to the shape of and to move along the pipe 10 to be cleaned.

There is an oven which is formed of the longitudinal sections 11 and 12.

The section 12 of the oven is welded, or otherwise secured, to the body 1 of the carriage, as indicated in Figure 1, and the sections 11, 12 are hinged together by means of a suitable hinge 13.

Figure 3:
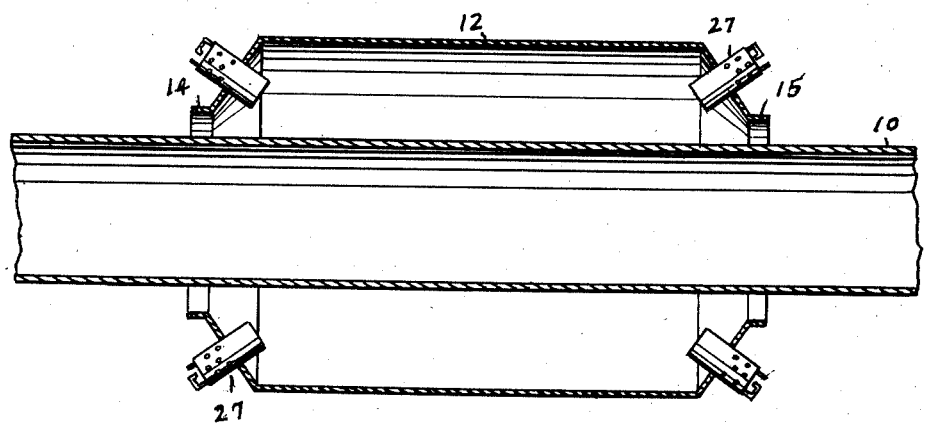
Figure 3 is a horizontal, cross-sectional view taken on the line 3—3 of Figure 2.

As will be noted, particularly from an inspection of Figures 1 and 3, the ends of the oven are slightly contracted and terminate in outwardly turned circular flanges 14 and 15.

Figure 5:
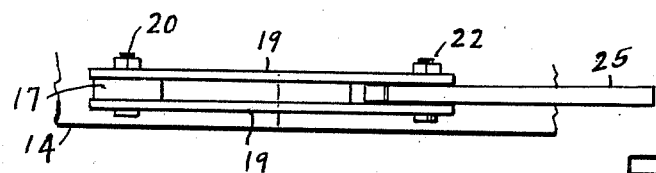
Figure 5 is a plan view of said latch.
Figure 6:
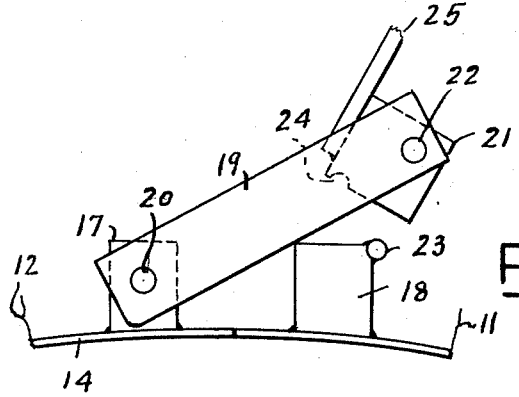
Figure 6 is an elevational view showing the latch released.
Figure 2:
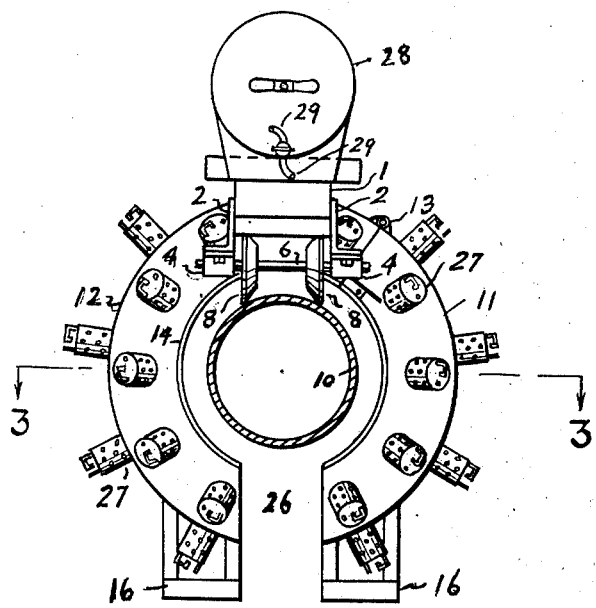
Figure 2 is an end view.

The lower margins of the oven sections are spaced apart, as shown in Figure 2 and are also provided with depending supporting legs 16, 16 which, preferably, extend from end to end of the cylindrical portion of the oven. The sections 11, 12 of the oven may be latched in closed, or operating, position by means of a novel type of latch mechanism shown in Figures 4, 5 and 6.

At each end of the oven the parts of the flanges 14, 15 which are integral with the oven section 12 have the upstanding lugs, as 17, welded, or otherwise secured thereto, and the adjacent end of the complemental portion of said flanges carried by the oven section 11 have the upstanding lugs 18 welded or otherwise secured thereto and in alignment with the corresponding lugs 17.

The ends of the parallel bars 19, 19 embrace each lug 17 and are pivoted thereto by means of bolts, as 20, and pivoted between the other ends of said bars there is a latch plate 21 which pivots about a bolt 22 which passes through said bars and through the latch plate.

Figure 4:
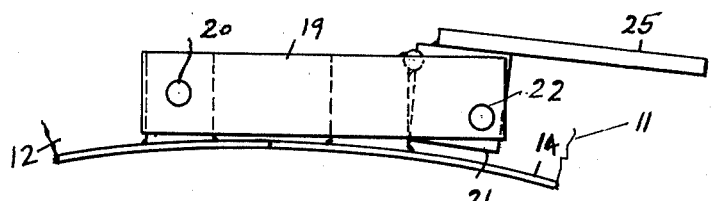
Figure 4 is an elevational view of a latch employed for latching the sections of the oven in operating position.

When the latch bars 19 are in securing or latching position they will straddle the corresponding lugs 18 and the upper outer corner of this lug 18 is provided with a transverse detent 23 to receive a corresponding notch 24 in the adjacent margin of the latch plate so that when the latch is holding position the detent 23 will be received by the notch 24, as shown in Figure 4, and the adjacent margins of the lug 18 and the latch plate 24 are so spaced that said latch plate will be swung past center when in latching position so as to remain in latched position until manually released.

The latch may be operated by means of a handle 25 secured to the upper margin of the latch plate 21 and extending outwardly therefrom.

When the latch is secured in closed position the lower margins of the sections 11 and 12 will still be spaced apart thus providing an opening 26, as shown in Figure 2, so that there will be no collections of foreign matter, ice or the like in the oven but such matter may freely pass therethrough.

It will be noted from an inspection of Figures 2 and 3 that the ends of the oven, that is the flanges 14 and 15, are spaced a distance from the pipe 10 to be conditioned so that there will be free passageways for the outlet of the products of combustion within the oven.

Suitably fastened to the ends of the oven are the hoods 27 containing any selected type of burner positioned to project flames into the oven around the pipe. These burners may be spaced apart around the ends of the oven as well as located at intermediate portions thereof, as indicated in Figures 1 and 2. A suitable fuel tank has been provided. In the present illustration it is indicated by the numeral 28 and is mounted on the carriage 1. Suitable hose, as 29, lead from this tank to manifolds, as 30, and distributing hose, as 31, lead from the manifolds, on each side of the oven, to the corresponding burners. The flow of fuel from the tank 28 may be controlled by a suitable valve such, as 32. Ordinarily in cleaning and reconditioning the pipe the oven will be mounted on, and pass along, the pipe to be reconditioned, as indicated in Figures 2 and 3.

In some instances, however, when the surface of the pipe is wet it is desirable to insert a sleeve, as 33, through the oven from end to end, as indicated in Figure 1. This sleeve is spaced both from the pipe as well as from the flanges 14, 15. It may be held in position, while in use, by suitable brackets, as 34, which are fastened to one end thereof and which are engageable over one, or both, of the end flanges 14, 15 to maintain the sleeve in position. When the sleeve is used the burner flames do not reach the pipe directly but the products of combustion pass out from the oven between the sleeve and the end flanges, as indicated by the arrow in Figure 1, and the vapor formed within the sleeve may pass out through the ends of the sleeve.

This sleeve 33 is primarily intended for use only when the oven is being used on a wet pipe to dry the same preparatory to conditioning the pipe.

What I claim is:

1. Pipe cleaning equipment comprising, an oven shaped to surround a pipe to be cleaned and contracted at its ends, said oven having an elongated, narrow bottom outlet forming a channel through the oven, a carriage arranged to move longitudinally relative to the pipe and supporting the oven on the pipe.

2. Pipe cleaning equipment comprising, an oven shaped to surround a pipe to be cleaned and contracted at its ends, said oven having a longitudinal, narrow bottom outlet forming a channel completely through the oven, a carriage arranged to move longitudinally relative to the pipe and supporting the oven on the pipe and means for generating heat in the oven about the pipe.

3. Pipe cleaning equipment comprising, a carriage adapted to move along the pipe to be cleaned, oven sections hinged together and depending from the carriage and shaped to close about the pipe and form a chamber about the pipe which is open at its ends and which has a longitudinally elongated bottom outlet forming a channel through the oven opening outwardly through the ends thereof and means for generating heat within the oven about the pipe.

4. Pipe cleaning equipment comprising, a carriage supported on and movable longitudinally relative to the pipe to be cleaned, an oven formed of sections hinged together and depending from the carriage and shaped to close about the pipe and form a chamber around the pipe which is open at its ends and which has a longitudinally elongated, relatively narrow bottom outlet opening forming an open-ended channel through the oven, means for generating heat within the oven about the pipe and means for moving the carriage and oven along the pipe.

5. Pipe cleaning equipment comprising, a carriage movable along a pipe to be cleaned, an oven on the carriage and shaped to surround a pipe and form a chamber about the pipe which is open at its ends and which has a longitudinally, relatively narrow bottom outlet opening forming a channel through the oven from end to end thereof and opening outwardly through the ends of the oven and means for generating heat in the oven.

6. Pipe cleaning equipment comprising, a carriage, an oven supported by the carriage and shaped to surround a pipe and to form a chamber about the pipe, a sleeve extended through the oven and spaced therefrom to provide end outlets about the sleeve, said sleeve being also spaced from, and arranged to surround, the pipe being cleaned and means for generating heat within the oven about the sleeve.

7. Pipe cleaning equipment comprising, a carriage, an oven supported by the carriage and shaped to surround a pipe and to form a chamber about the pipe and having a bottom outlet opening, a cylindrical sleeve extended through the oven and spaced therefrom to provide end outlets about the sleeve, said sleeve also surrounding and being spaced from the pipe being cleaned and means for generating heat within the oven about the sleeve.

OLIVER R. SMITH.

REFERENCES CITED

The following references are of record in the file of this patent:

UNITED STATES PATENTS

| Number | Name | Date |
|---|---|---|
| 2,058,388 | Rendleman | Oct. 20, 1936 |
| 2,282,397 | Deck | May 12, 1942 |
| 2,288,980 | Turin | July 7, 1942 |
| 2,289,967 | Johnson et al. | July 14, 1942 |
| 2,412,758 | Smith | Dec. 17, 1946 |
| 2,416,412 | Smith | Feb. 25, 1947 |

FOREIGN PATENTS

| Number | Country | Date |
|---|---|---|
| 438,382 | Great Britain | 1935 |